US012577503B2

(12) United States Patent
Izmitli et al.

(10) Patent No.: US 12,577,503 B2
(45) Date of Patent: Mar. 17, 2026

(54) CLEANING BOOSTER ADDITIVE

(71) Applicants: Dow Global Technologies LLC, Midland, MI (US); Rohm and Haas Company, Collegeville, PA (US)

(72) Inventors: Aslin Izmitli, Spring City, PA (US); Michael C. Mitchell, Norristown, PA (US); Randara Pulukkody, Lansdale, PA (US); Muhunthan Sathiosatham, Chalfont, PA (US); Michael Tulchinsky, Midland, MI (US); Eric Wasserman, Collegeville, PA (US)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 221 days.

(21) Appl. No.: 18/556,145

(22) PCT Filed: Jul. 13, 2022

(86) PCT No.: PCT/US2022/036886
§ 371 (c)(1),
(2) Date: Oct. 19, 2023

(87) PCT Pub. No.: WO2023/287835
PCT Pub. Date: Jan. 19, 2023

(65) Prior Publication Data

US 2024/0360387 A1 Oct. 31, 2024

Related U.S. Application Data

(60) Provisional application No. 63/222,453, filed on Jul. 16, 2021.

(51) Int. Cl.
*C11D 3/00* (2006.01)
*C11D 3/37* (2006.01)

(52) U.S. Cl.
CPC .......... *C11D 3/3707* (2013.01); *C11D 3/0036* (2013.01); *C11D 2111/12* (2024.01)

(58) Field of Classification Search
CPC . C11D 3/3707; C11D 3/0036; C11D 2111/12; C11D 3/3723
USPC .................................................. 510/517, 528
See application file for complete search history.

(56) References Cited

U.S. PATENT DOCUMENTS 3,293,297 A 12/1966 Louvar et al.
4,108,922 A 8/1978 Crescentini et al.
4,272,394 A 6/1981 Kaneko
4,306,987 A 12/1981 Kaneko
6,369,268 B1 * 4/2002 Ehlis ........................ C11D 1/46 564/511
7,884,137 B2 2/2011 Wang
8,759,276 B2 6/2014 Man et al.
9,605,163 B2 3/2017 Peera et al.
9,752,101 B2 * 9/2017 Loughnane ........ C11D 3/38618
2009/0005288 A1 1/2009 Boutique et al.
2010/0235776 A1 9/2010 Brown
2010/0261634 A1 10/2010 Misske et al.
2011/0152162 A1 6/2011 Schneiderman et al.
2013/0171210 A1 7/2013 Baker
2015/0091009 A1 4/2015 Yamazaki et al.

(Continued)

FOREIGN PATENT DOCUMENTS

CN 107417904 12/2017
EP 0021431 1/1981

(Continued)

OTHER PUBLICATIONS

STIC Search Report dated Oct. 8, 2025.*
He, "Interfacial sciences in unconventional petroleum production: from fundamentals to applications." Chem. Soc. Rev. 2015, p. 5478-5480, vol. 44.
Levi "Influence of structure of surface-active succinic acid-derivatives containing polyethylene-glycol groups on the properties of these compounds", Colloid Journal of the USSR, 1985, p. 303-308, vol. 47.
Tulu, "Synthesis and properties of hydrophilic polymers. Part 7. Preparation, characterization and metal complexation of carboxy-functional polyesters based on poly(ethylene glycol)", Polym. Int. 1999, p. 909-914, vol. 48.

*Primary Examiner* — Eisa B Elhilo
(74) *Attorney, Agent, or Firm* — Thomas S. Deibert

(57) ABSTRACT

Cleaning booster for cleaning dirty laundry is provided, wherein the cleaning booster is of formula (I) wherein b is 2 to 4; wherein x is 0 to 2; wherein each R is independently selected from the group consisting of a hydrogen, a $C_{1-22}$ alkyl group and a $—CH_2C(═O)R^1$ group; wherein each $R^1$ is independently of formula (II) wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^8$ and $R^9$ is a hydrogen in each subunit α; and wherein α is 0 to 30.

(I)

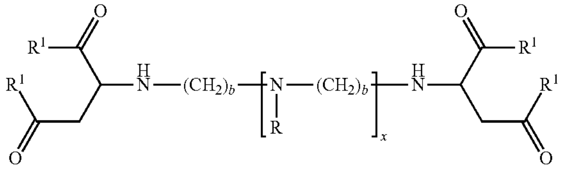

(II)

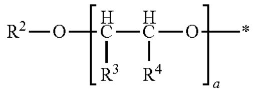

8 Claims, No Drawings

(56) References Cited

U.S. PATENT DOCUMENTS

| | | | |
|---|---|---|---|
| 2015/0148890 | A1 | 5/2015 | Hartley et al. |
| 2015/0329479 | A1 | 11/2015 | Ma et al. |
| 2019/0390012 | A1 | 12/2019 | Hueffer et al. |

FOREIGN PATENT DOCUMENTS

| | | | |
|---|---|---|---|
| EP | 0794245 | 9/1997 | |
| WO | 2013180730 | 12/2013 | |
| WO | 2018072979 | 4/2018 | |
| WO | WO 2021061774 A1 * | 4/2021 | ......... C11D 17/0008 |

* cited by examiner

CLEANING BOOSTER ADDITIVE

The present invention relates to a cleaning booster for cleaning dirty laundry. In particular, the present invention relates to a cleaning booster for cleaning dirty laundry, wherein the cleaning booster is of formula (I)

(I)

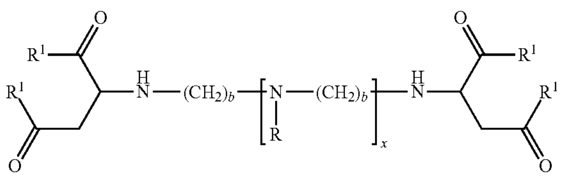

wherein each c is independently 2 to 4; wherein x is 0 to 2; wherein each R is independently selected from the group consisting of a hydrogen, a $C_{1-22}$ alkyl group and a $—CH_2C(═O)R^1$ group; wherein each $R^1$ is independently of formula (II)

(II)

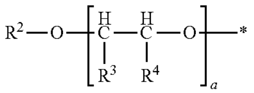

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; and wherein a is 0 to 30.

Laundry detergents, particularly those in liquid and gel forms, providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for cleaning boosters that facilitate maintained primary cleaning performance with reduced surfactant loading laundry detergent formulations (particularly in liquid or gel laundry detergent formulations); preferably, while also providing improved anti-redeposition performance. There is also a continuing need for new cleaning boosters with improved biodegradability according to OECD 301F protocol when compared with conventional cleaning boosters.

The present invention provides a cleaning booster for cleaning dirty laundry, wherein the cleaning booster is of formula (I)

(I)

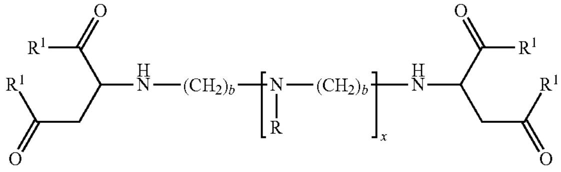

wherein b is 2 to 4; wherein x is 0 to 2; wherein each R is independently selected from the group consisting of a hydrogen, a $C_{1-22}$ alkyl group and a $—CH_2C(═O)R^1$ group; wherein each $R^1$ is independently of formula (II)

(II)

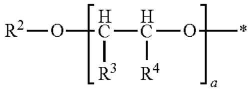

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; and wherein a is 0 to 30.

The present invention provides a cleaning booster for cleaning dirty laundry, wherein the cleaning booster is of formula (I)

(I)

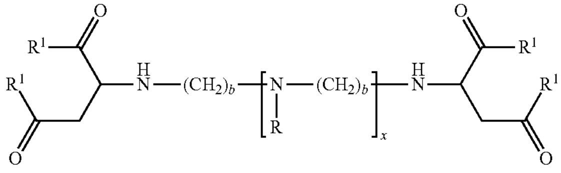

wherein b is 2 to 4; wherein x is 0 to 2; wherein each R is independently selected from the group consisting of a hydrogen, a $C_{1-22}$ alkyl group and a $—CH_2C(═O)R^1$ group; wherein each $R^1$ is independently of formula (II)

(II)

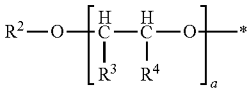

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; wherein a is 0 to 30; wherein 70 to 100 mol % of the $R^1$ groups in the cleaning booster are of formula (II) wherein a is 2 to 30.

The present invention provides a cleaning booster for cleaning dirty laundry, wherein the cleaning booster is of formula (I)

(I)

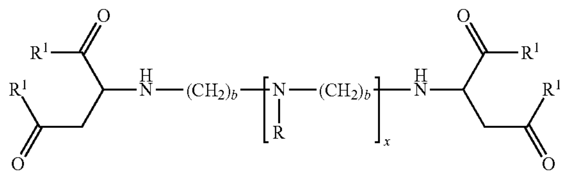

wherein b is 2 to 4; wherein x is 0 to 2; wherein each R is independently selected from the group consisting of a hydrogen, a $C_{1-22}$ alkyl group and a $—CH_2C(=O)R^1$ group; wherein each $R^1$ is independently of formula (II)

(II)

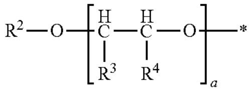

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; and wherein a is 0 to 30; wherein 70 to 100 mol % of the $R^1$ groups in the cleaning booster of formula (II) are of formula (IIa)

$$R^5—O—[CH_2CH(R^6)O]_y—* \quad \text{(IIa)}$$

wherein the * indicates the point of attachment to formula (I); wherein $R^5$ is selected from the group consisting of a hydrogen and a $C_{1-22}$ alkyl group; wherein each $R^6$ is independently selected from the group consisting of a hydrogen and a $C_{1-2}$ alkyl group; and wherein y is 2 to 30.

The present invention provides a cleaning booster for cleaning dirty laundry, wherein the cleaning booster is of formula (I)

(I)

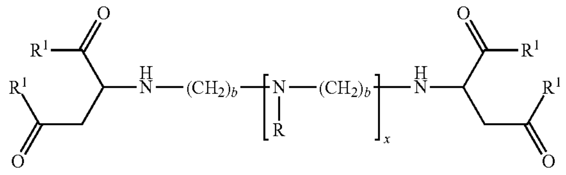

wherein b is 2 to 4; wherein x is 0 to 2; wherein each R is independently selected from the group consisting of a hydrogen, a $C_{1-22}$ alkyl group and a $—CH_2C(=O)R^1$ group; wherein each $R^1$ is independently of formula (II)

(II)

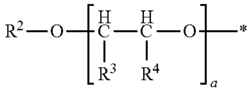

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; and wherein a is 0 to 30; wherein 70 to 100 mol % of the $R^1$ groups in the cleaning booster of formula (II) are of formula (IIb)

$$R^7—O\text{-}(EO)_h—(PO)_i\text{-}(EO)_j—* \quad \text{(IIb)}$$

wherein the * indicates the point of attachment to formula (Ia); wherein $R^7$ is selected from the group consisting of a hydrogen and a $C_{1-12}$ alkyl group; wherein EO is an ethylene oxide group; wherein PO is a propylene oxide group; wherein h is 0 to 30; wherein i is 0 to 30; wherein j is 0 and 30; and wherein h+i+j is 2 to 30.

The present invention provides a laundry additive comprising a mixture of a cleaning booster of the present invention and water.

DETAILED DESCRIPTION

It has been surprisingly found that the cleaning boosters as described herein facilitate improvement in primary cleaning performance for sebum soil removal, while imparting good anti-redeposition performance for dust sebum and clay and also exhibiting desirable biodegradability profiles according to OECD 301F protocol.

Preferably, the cleaning booster for cleaning dirty laundry, of the present invention, is of formula (I)

(I)

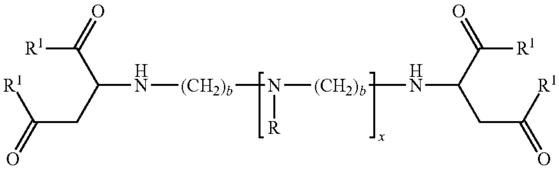

wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(=O)R^1$ group (preferably, a hydrogen, a $C_{1-5}$ alkyl group and a $—CH_2C(=O)R^1$ group; more preferably, a hydrogen, a $C_{1-2}$ alkyl group and a $—CH_2C(=O)R^1$ group; still more preferably, a methyl and a $—CH_2C(=O)R^1$ group; most preferably, a methyl group); wherein each $R^1$ is independently of formula (II) (i.e., the individual occurrences of $R^1$ in formula (I) can be the same or different from one another)

(II)

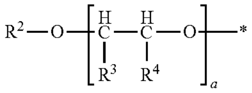

wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; and wherein a is 0 to 30 (preferably, 2 to 25; more preferably, 2 to 17; most preferably, 4 to 12).

More preferably, the cleaning booster for cleaning dirty laundry, of the present invention, is of formula (I); wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(═O)R^1$ group (preferably, a hydrogen, a $C_{1-5}$ alkyl group and a $—CH_2C(═O)R^1$ group; more preferably, a hydrogen, a $C_{1-2}$ alkyl group and a $—CH_2C(═O)R^1$ group; still more preferably, a methyl and a $—CH_2C(═O)R^1$ group; most preferably, a methyl group); wherein each $R^1$ is independently of formula (II) (i.e., the individual occurrences of $R^1$ in formula (I) can be the same or different from one another); wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; wherein a is 0 to 30; and wherein a is 2 to 30 (preferably, 2 to 25; more preferably, 2 to 17; most preferably, 4 to 12) in 70 to 100 mol % (preferably, 80 to 100 mol %; more preferably, 90 to 100 mol %; most preferably, 95 to 100 mol %) of the occurrences of formula (II) in the cleaning booster.

Still more preferably, the cleaning booster for cleaning dirty laundry, of the present invention, is of formula (I); wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(═O)R^1$ group (preferably, a hydrogen, a $C_{1-5}$ alkyl group and a $—CH_2C(═O)R^1$ group; more preferably, a hydrogen, a $C_{1-2}$ alkyl group and a $—CH_2C(═O)R^1$ group; still more preferably, a methyl and a $—CH_2C(═O)R^1$ group; most preferably, a methyl group); wherein each $R^1$ is independently of formula (II) (i.e., the individual occurrences of $R^1$ in formula (I) can be the same or different from one another); wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; wherein a is 0 to 30; and wherein 70 to 100 mol % (preferably, 80 to 100 mol %; more preferably, 90 to 100 mol %; most preferably, 95 to 100 mol %) of the $R^1$ groups in the cleaning booster of formula (II) are of formula (IIa)

$$R^5—O—[CH_2CH(R^6)O]_y—* \quad \text{(IIa)}$$

wherein the * indicates the point of attachment to formula (I); wherein $R^5$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a $C_{1-4}$ alkyl group; most preferably, a $C_4$ alkyl group); wherein each $R^6$ is independently selected from the group consisting of a hydrogen and a $C_{1-2}$ alkyl group; and wherein y is 2 to 30 (preferably, 2 to 25; more preferably, 2 to 17; most preferably, 4 to 12).

Most preferably, the cleaning booster for cleaning dirty laundry, of the present invention, is of formula (I); wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(═O)R^1$ group (preferably, a hydrogen, a $C_{1-5}$ alkyl group and a $—CH_2C(═O)R^1$ group; more preferably, a hydrogen, a $C_{1-2}$ alkyl group and a $—CH_2C(═O)R^1$ group; still more preferably, a methyl and a $—CH_2C(═O)R^1$ group; most preferably, a methyl group); wherein each $R^1$ is independently of formula (II) (i.e., the individual occurrences of $R^1$ in formula (I) can be the same or different from one another); wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^8$ and $R^9$ is a hydrogen in each subunit a; wherein a is 0 to 30; and wherein 70 to 100 mol % (preferably, 80 to 100 mol %; more preferably, 90 to 100 mol %; most preferably, 95 to 100 mol %) of the $R^1$ groups in the cleaning booster of formula (II) are of formula (IIb)

$$R^7—O\text{-}(EO)_h—(PO)_i\text{-}(EO)_j—* \quad \text{(IIb)}$$

wherein the * indicates the point of attachment to formula (Ia); wherein $R^7$ is selected from the group consisting of a hydrogen and a $C_{1-12}$ alkyl group (preferably, a hydrogen and a $C_{1-12}$ alkyl group; more preferably, a hydrogen and a $C_{1-5}$ alkyl group; still more preferably, a $C_{1-4}$ alkyl group; most preferably, a $C_4$ alkyl group); wherein EO is an ethylene oxide group; wherein PO is a propylene oxide group; wherein h is 0 to 30 (preferably, 0 to 5; more preferably, 0 to 2; most preferably, 0 to 1); wherein i is 0 to 30 (preferably, 0 to 10; more preferably, 0 to 7; most preferably, 2 to 5); wherein j is 0 and 30 (preferably, 2 to 10; more preferably, 2 to 8; most preferably, 2 to 6); and wherein h+i+j is 2 to 30 (preferably, 2 to 25; more preferably, 2 to 17; most preferably, 4 to 12).

Preferably, the laundry additive of the present invention comprises a mixture of a cleaning booster of the present invention and water. More preferably, the laundry additive of the present invention is a mixture comprising 0.1 to 99 wt % (preferably, 0.2 to 98 wt %; more preferably, 0.5 to 95 wt %; most preferably, 0.75 to 90 wt %), based on weight of the laundry additive, of a cleaning booster of the present invention; and 1 to 99.9 wt % (preferably, 2 to 99.8 wt %; more preferably, 5 to 99.5 wt %; most preferably, 10 to 99.25 wt %), based on weight of the laundry additive, of a water. Most preferably, the laundry additive of the present invention is a mixture comprising 0.1 to 99 wt % (preferably, 0.2 to 98 wt %; more preferably, 0.5 to 95 wt %; most preferably, 0.75 to 90 wt %), based on weight of the laundry additive, of a cleaning booster of the present invention; and 1 to 99.9 wt % (preferably, 2 to 99.8 wt %; more preferably, 5 to 99.5 wt %; most preferably, 10 to 99.25 wt %), based on weight of the laundry additive, of a water; wherein the laundry additive is a liquid (preferably, wherein the laundry additive is a liquid at 21° C. and 1 standard atmosphere of pressure).

Some embodiments of the present invention will now be described in detail in the following Examples.

Reagents used in the Examples are described in TABLE 1.

TABLE 1

| Identifier | Description |
|---|---|
| Ethylene glycol monobutyl ether | available from The Dow Chemical Company under tradename BUTYL CELLOSOLVE ™ |
| AE1 | $C_{12-15}$ alcohol ethoxylate-9 (600 g/mol) available from Stepan Company under tradename BIO-SOFT ® N25-9 |
| AE2 | $C_{12-15}$ alcohol ethoxylate-7 (510 g/mol) available from Stepan Company under tradename BIO-SOFT ® N25-7 |
| EO | Ethylene oxide |
| PO | Propylene oxide |
| Titanium isopropoxide | available from Sigma Aldrich |
| Dimethyl maleate | 97% available from TCI Chemicals |

Synthesis S1: EO-Terminated Block PO-Copolymer

Potassium hydride (0.5 g) was dissolved with stirring, under nitrogen, in ethylene glycol monobutyl ether (25 g). Of this mixture, 23.6 g was charged by syringe to a nitrogen-purged reactor. The reactor was sealed and then charged with propylene oxide (41.5 g; 50.0 mL) at 120° C. with a pumping rate of 1 mL/min. A reactor pressure increase was noted as the propylene oxide was added. The reactor contents were allowed to react with the addition of the propylene oxide for 9 hours; during which time the reactor pressure was observed to decrease and then leveled off as the propylene oxide was consumed. Then ethylene oxide (33.5 g; 38.0 mL) was charged to the reactor contents at 130° C. with a pumping rate of 1 m/min. The reactor contents were allowed to react with the addition of the ethylene oxide for 4 hours. The reactor was then vented, purged with nitrogen, and the product was recovered. The yield was quantitative. $^1H$ NMR ($CDCl_3$, 6, ppm): 0.90 t (3H, $CH_3$), 1.13 m (8.48 H, $CH_3$ of PO), 1.35 m (2H, $CH_2$), 1.55 m (2H, $CH_2$), 3.55 m (35.93 H, $CHCH_2$ of PO+$CH_2CH_2$ of EO). NMR analysis suggested the following formula for the recovered product: $CH_3CH_2CH_2CH_2OCH_2CH_2O(PO)_{2.83}(EO)_{5.36}H$. GPC (in THF): $M_n$=739, $M_w$=859, PDI=1.16. For the purposes of calculating reaction stoichiometries in the referenced Syntheses to follow, the FW calculated from the established above empirical formula from NMR was used: 519 Daltons.

Synthesis S2: EO-Terminated Block PO-Copolymer

Potassium hydride (0.4 g) was dissolved with stirring, under nitrogen, in ethylene glycol monobutyl ether (20.75 g). Of this mixture, 21.15 g was charged by syringe to a nitrogen-purged reactor. The reactor was sealed and then charged with propylene oxide (41.5 g; 50.0 mL) at 115° C. with a pumping rate of 1 mL/min. A reactor pressure increase was noted as the propylene oxide was added. The reactor contents were allowed to react with the addition of the propylene oxide for 22 hours; during which time the reactor pressure was observed to decrease and then leveled off as the propylene oxide was consumed. Then ethylene oxide (28.85 g; 33.0 mL) was charged to the reactor contents at 130° C. with a pumping rate of 1 m/min. The reactor contents were allowed to react with the addition of the ethylene oxide for 4 hours. The reactor was then vented, purged with nitrogen, and the product was recovered. The yield was 85.4 g (93%). $^1H$ NMR ($CDCl_3$, 6, ppm): 0.90 t (3H, $CH_3$), 1.13 m (11.05 H, $CH_3$ of PO), 1.35 m (2H, $CH_2$), 1.55 m (2H, $CH_2$), 3.55 m (31.02 H, $CHCH_2$ of PO+$CH_2CH_2$ of EO). NMR analysis suggests the following formula: $CH_3CH_2CH_2CH_2OCH_2CH_2O(PO)_{3.68}(EO)_{3.49}H$. GPC (in THF): $M_n$=641, $M_w$=761, PDI=1.19. For the purposes of calculating reaction stoichiometries in the examples to follow, the FW calculated from the established above empirical formula from NMR was used: 486 Daltons.

Synthesis S3: Dimethyl Maleate Plus 3,3'-diamino-n-methyldipropylamine 3,3'-diamino-n-methyldipropylamine (7.492 g, 50.5 mmol) was charged to a glass vial with a magnetic stir bar. The vial was sealed with a cap containing a septum and then placed in an ice bath on top of a magnetic stirrer for gentle mixing. A needle-style thermocouple probe was inserted through the septum to record the temperature. Dimethyl maleate (15.050 g, 101 mmol, 2.0 eq.) was then slowly delivered via syringe over 30 minutes into the vial to control the exothermic reaction to the extent of achieving a maximum internal temperature of 25.1° C. After the dimethyl maleate addition, the vial was heated in an OptiTHERM® Reaction Block attached to an IKA magnetic stirring/heating plate with a target temperature of 45° C. The vial contents ware maintained at a temperature of 44.0 to 46.5° C. for two hours. The clear faint yellow oily product was then cooled and characterized. $^1H$ NMR (acetone-$d_6$, δ, ppm): 6.80* (s, 0.1H), 3.87-3.74 (0.4H), 3.69 (s, 5.6H), 3.63 (s, 5.6H), 3.59 (t, J=6.9 Hz, 2.0H), 2.76-2.62 (3.8H), 2.62-2.44 (4.0H), 2.32 (tt, J=6.6, 3.3 Hz, 4.2H), 2.13 (s, 3.7H), 1.55 (m, J=6.9 Hz, 4.0H). $^{13}C$ {$^1H$} NMR (acetone-$d_6$, δ, ppm): 174.71 (2.1 C), 171.82 (2.2 C), 165.72* (0.1 C), 133.98* (0.2 C), 58.68 (2.1 C), 56.71 (2.1 C), 53.96-50.50 (5.4 C), 48.46-46.19 (2.0 C), 42.48 (1.1 C), 38.52 (2.0 C), 28.60 (2.0 C). (Peaks marked with an asterisk were attributed to dimethyl fumarate byproduct.)

Synthesis S4: Transesterification with Alkoxylated Butanol

Product prepared according to Synthesis S3 (1.9897 g, 4.59 mmol), EO-terminated block copolymer prepared according to Synthesis S1 (10.0177 g, 19.3 mmol, 4.2 eq.) and titanium isopropoxide (0.1765 g, 0.6210 mmol, 14 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 100° C. After reaching 100° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 109.2-118.2° C. for six hours under vacuum. The flask contents were then cooled and characterized. On the basis of $^{13}C$ NMR spectrum taken in $CDCl_3$, the ratio of residual methyl ester carbons (51.8 ppm) to methyl carbons attached to N (42.1 ppm) is 0.28:1, and the ratio of $CH_2OH$ groups (61.4 ppm) to methyl carbons attached to N is 0.17:1. Given the ratio of methyl carbons associated with the butyl groups of alkoxylated butanol (13.9 ppm) to the methyl carbons attached to N being 4:1, it appears the extent of reaction was >90%.

Synthesis S5: Transesterification of Dimethyl Maleate Adduct with Alkoxylated Butanol EO-terminated block copolymer prepared according to Synthesis S2 (10.0862 g, 20.8 mmol, 4.4 eq.), material prepared according to Synthesis S3 (2.0554 g, 4.74 mmol) and titanium isopropoxide (0.1769 g, 0.62 mmol, 13 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 120° C. After reaching 112.8° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 119.9-121.2° C. for seven hours under vacuum. The flask contents were then cooled and characterized. On the basis of $^{13}C$ NMR spectrum taken in $CDCl_3$, the extent of reaction was >95% due to the disappearance of the signal for residual methyl ester carbons (51.8 ppm).

Comparative Examples C1-C2 and Examples 1-2: Liquid Laundry Detergent

The liquid laundry detergent formulations used in the cleaning tests in the subsequent Examples were prepared having the generic formulation as described in TABLE 2 with the cleaning booster as noted in TABLE 3 neutralized to a pH of 8.5 were prepared by standard liquid laundry formulation preparation procedures.

TABLE 2

| Ingredient | Commercial Name | wt % |
|---|---|---|
| Linear alkyl benzene sulfonate | Nacconal 90G* | 16.0 |
| Sodium lauryl ethoxysulfate | Steol CS-460* | 4.0 |
| Propylene glycol | — | 5.0 |
| Ethanol | — | 2.0 |
| Sodium citrate | — | 5.0 |
| Non-ionic surfactant | Biosoft N25-7* | 5.0 |
| Sodium xylenesulfonate | Stepanate SXS-93 | 5.5 |
| Fatty acid | Prifac 7908[a] | 3.0 |
| Cleaning Booster | — | 5.0 |
| Deionized water | — | QS to 100 |

*available from Stepan Company
[a]available from Croda

TABLE 3

| Example | Cleaning Booster |
|---|---|
| Comparative Example C1 | none |
| Comparative Example C2 | Alcohol ethoxylate[1] |
| Example 1 | Synthesis S4 |
| Example 2 | Synthesis S5 |

[1]available from Stepan Company under the tradename BIO-SOFT ® N25-9

Primary Cleaning Performance

The primary cleaning performance of the liquid laundry detergent formulations of Comparative Examples C1-C2 and Examples 1-2 were assessed in a Launder-Ometer (SDL Atlas, Model M228AA) at a set test temperature of 22° C. using an 18 minute wash cycle. Twenty of the 1.2 liter canisters were filled with 500 mL of hardness adjusted water at 100 ppm by mass with 2:1 Ca:Mg molar ratio were used for each run. The washed fabrics were rinsed in 300 mL of 100 ppm (2/1 Ca/Mg) hardness adjusted water at ambient temperature for 5 minutes at 260 osc/min pm on an Eberbach E6000 reciprocal shaker. The stained fabrics and soiled ballasts used in the tests were PCS-S-132 high discriminative sebum BEY pigment and PCS-S-94 sebum/dust ASTM stains from Testfabrics stitched to a pre-shrunk cotton interlock fabric. The size of the cotton interlock was 5×5 cm. The stained swatches were 2.5×3 cm. One 5×5 cm cut SBL-CFT soil ballast was added to each canister to provide baseline soil to the wash solution. The total surfactant concentration in the wash liquor was 200 ppm.

Reflectance Measurement and Stain Removal Index (SRI)

The soil removal index (SRI) for each of the Liquid Laundry Detergent formulations evaluated in Primary Cleaning Performance Test were determined using ASTM Method D4265-14. The average SRI taken from 8 swatches per condition (two swatches per pot, 4 pots) is provided in TABLE 4.

The L*, a* and b* values of the stained fabrics were measured pre and post wash with a Mach 5 spectrophotometer from Colour Consult. The L*, a* and b* values for the unwashed, unstained polycotton fabric was measured in the SRI calculations as follows:

$$SRI = \frac{(\Delta E^*_{(US-UF)} - \Delta E^*_{(WS-UF)})}{\Delta E^*_{(US-UF)}} \times 100$$

wherein US is the unwashed stain area, UF is the unwashed (unstained) fabric area, WS is the washed stain area, $\Delta E^*_{(US-UF)}$ is the $\Delta E^*$ color difference between the unwashed stain and the unwashed fabric and $\Delta E^*_{(WS-UF)}$ is the $\Delta E^*$ color difference between the washed stain and the unwashed fabric. The value of $\Delta E^*$ is calculated as $$\Delta E^* = (\Delta L^{*2} + \Delta a^{*2} + \Delta b^{*2})^{1/2}$$

The ΔSRI values provided in TABLE 4 give the difference between the SRI measured for the noted example relative to the SRI measured for Comparative Example C1. A positive value indicates an increase in soil removal relative to Comparative Example C1.

TABLE 4

| | | ΔSRI | |
|---|---|---|---|
| Example | Cleaning Booster | PCS-94 | PCS-132 |
| Comparative Example C2 | Alcohol ethoxylate[1] | 4.37 | 2.65 |
| Example 1 | Synthesis S4 | 6.72 | 4.60 |
| Example 2 | Synthesis S5 | 3.92 | 3.62 |

[1]available from Stepan Company under the tradename BIO-SOFT ® N25-9

Comparative Examples C3-C4 and Example 3: Liquid Laundry Detergent

The liquid laundry detergent formulation used in the cleaning tests in the subsequent Examples was prepared by combining 0.5 g of a standard liquid laundry detergent formulation with an adjusted pH of 8.5 as described in TABLE 5 with 1.5 g of a 1 w % aqueous solution of the cleaning booster noted in TABLE 6.

TABLE 5

| Ingredient | Commercial Name | wt % |
|---|---|---|
| Linear alkyl benzene sulfonate | Nacconal 90G* | 12 |
| Sodium lauryl ethoxysulfate | Steol CS-460* | 2 |
| Propylene glycol | — | 3.5 |
| Ethanol | — | 1.5 |
| Deionized water | — | QS to 100 |

*available from Stepan Company
[a] available from The Dow Chemical Company

TABLE 6

| Example | Cleaning Booster |
|---|---|
| Comparative Example C3 | None |
| Comparative Example C4 | Alcohol ethoxylate[1] |
| Example 3 | Synthesis S4 |

[1]available from Stepan Company under the tradename BIO-SOFT ® N25-9

Anti-Redeposition

The anti-redeposition performance of the combination of the standard liquid laundry detergent+cleaning booster of Comparative Examples C3-C4 and Example 3 was assessed in a Terg-o-tometer Model 7243ES agitated at 90 cycles per minute with the conditions noted in TABLE 7.

TABLE 7

| Parameter | Setting |
|---|---|
| Temperature | 50° C. |
| Water hardness | 300 ppm, $Ca^{2+}/Mg^{2+}$ = 2/1 |
| Fabric Types | Cotton (C)<br>Cotton interlock (CI)<br>Cotton Terry (CT)<br>Polyester: cotton blend (PB)<br>Polyester knit (PK)<br>Polyester woven (PW)<br>two cloths of each type in each pot |
| Wash time | 60 minutes |
| Rinse time | 3 minutes |
| Liquid laundry detergent dosage | 0.5 g |
| Cleaning booster | 1.5 g of 1 wt % aqueous solution |
| Anti-redeposition soils | 2.5 g/L dust sebum<br>0.63 g/L Redart clay |
| Drying | After final rinse, fabrics were dried in a food dehydrator at 50° C. for 2 hours minutes |

The antiredeposition performance was determined by calculating the ΔE measured with a MACH 5+ instrument (L, a & b). The results are noted in TABLE 8, wherein ΔE* is according to the equation $$\Delta E^* = \Delta E_{aw} - \Delta E_{bw}$$

wherein $\Delta E_{aw}$ is measured from fabrics after washing, and $\Delta E_{bw}$ is measured from fabrics before washing. A higher ΔE* corresponds with better antiredeposition performance.

TABLE 8

| | ΔE* | | | | | |
|---|---|---|---|---|---|---|
| Example | CT | CI | CT | PB | PK | PW |
| Comp. Ex. C3 | 9.61 | 18.80 | 16.56 | 12.61 | 24.62 | 16.87 |
| Comp. Ex. C4 | 10.22 | 19.15 | 21.06 | 12.27 | 23.80 | 14.99 |
| Example 3 | 7.34 | 14.95 | 12.15 | 12.07 | 23.60 | 15.52 |

We claim:

1. A cleaning booster for cleaning dirty laundry, wherein the cleaning booster is of formula (I)

(I)

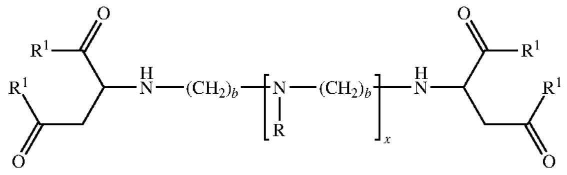

wherein b is 2 to 4; wherein x is 0 to 2; wherein each R is independently selected from the group consisting of a hydrogen, a $C_{1-22}$ alkyl group and a $—CH_2C(═O)R^1$ group; wherein each $R^1$ is independently of formula (II)

(II)

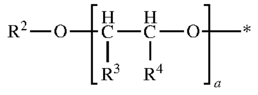

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; wherein a is 0 to 30; and wherein 70 to 100 mol % of the $R^1$ groups in the cleaning booster are of formula (II) wherein a is 2 to 30.

2. The cleaning booster of claim 1, wherein 70 to 100 mol % of the $R^1$ groups in the cleaning booster of formula (II) are of formula (IIa)

$$R^5—O—[CH_2CH(R^6)O]_y—* \quad (IIa)$$

wherein the * indicates the point of attachment to formula (I); wherein $R^5$ is selected from the group consisting of a hydrogen and a $C_{1-22}$ alkyl group; wherein each $R^6$ is independently selected from the group consisting of a hydrogen and a $C_{1-2}$ alkyl group; and wherein y is 2 to 30.

3. The cleaning booster of claim 1, wherein 70 to 100 mol % of the $R^1$ groups in the cleaning booster of formula (II) are of formula (IIb)

$$R^7—O\text{-}(EO)_h—(PO)_i\text{-}(EO)_j\text{-}* \quad (IIb)$$

wherein the * indicates the point of attachment to formula (I); wherein $R^7$ is selected from the group consisting of a hydrogen and a $C_{1-12}$ alkyl group; wherein EO is an ethylene oxide group; wherein PO is a propylene oxide group; wherein h is 0 to 30; wherein i is 0 to 30; wherein j is 0 and 30; and wherein h+i+j is 2 to 30.

4. The cleaning booster of claim 1, wherein b is 2; wherein x is 1 and R is a methyl group.

5. The cleaning booster of claim 3, wherein $R^7$ is a $C_{1-4}$ alkyl group.

6. The cleaning booster of claim 3, wherein h is 0 to 1; wherein i is 2 to 5; and wherein j is 2 to 6.

7. A laundry additive comprising a mixture of a cleaning booster of claim 1 and water.

8. The laundry additive of claim 7, wherein the laundry additive is a liquid.

* * * * *